US012634373B2

(12) United States Patent
Ha et al.

(10) Patent No.: US 12,634,373 B2
(45) Date of Patent: May 19, 2026

(54) APPARATUS AND METHOD FOR APPLYING SERVICE-BASED INTERFACE FOR USER TRAFFIC PROCESSING IN WIRELESS COMMUNICATION SYSTEM

(71) Applicant: ELECTRONICS AND TELECOMMUNICATIONS RESEARCH INSTITUTE, Daejeon (KR)

(72) Inventors: Jeoung Lak Ha, Daejeon (KR); Yoo Hwa Kang, Daejeon (KR); Changki Kim, Daejeon (KR); Taesik Cheung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 476 days.

(21) Appl. No.: 18/159,761

(22) Filed: Jan. 26, 2023

(65) Prior Publication Data

US 2023/0247101 A1 Aug. 3, 2023

(30) Foreign Application Priority Data

Jan. 28, 2022 (KR) ......................... 10-2022-0013489
May 10, 2022 (KR) ......................... 10-2022-0057368
Jan. 9, 2023 (KR) ......................... 10-2023-0003093

(51) Int. Cl.
　　*H04L 67/51* 　　　(2022.01)
　　*H04W 80/10* 　　　(2009.01)
(52) U.S. Cl.
　　CPC ............. *H04L 67/51* (2022.05); *H04W 80/10* (2013.01)
(58) Field of Classification Search
　　CPC ............................... H04L 67/51; H04W 80/10
　　See application file for complete search history.

(56) References Cited

U.S. PATENT DOCUMENTS

2014/0206403 A1* 7/2014 Buckley .................. H04L 69/24
　　　　　　　　　　　　　　　　　　　455/466
2018/0227871 A1* 8/2018 Singh .................... H04W 48/18
　　　　　　　　　　　(Continued)

FOREIGN PATENT DOCUMENTS

CN 　　114286354 A 　4/2022
EP 　　　3829142 A1 　6/2021
　　　　　　(Continued)

OTHER PUBLICATIONS

3GPP TS 29.244 V16.6.0 (Dec. 2020), 3rd Generation Partnership Project; Technical Specification Group Core Network and Terminals; Interface between the Control Plane and the User Plane Nodes; Stage 3 (Release 16); pp. 1-318.

(Continued)

*Primary Examiner* — Brian J. Gillis
*Assistant Examiner* — Thao D Duong
(74) *Attorney, Agent, or Firm* — Rabin & Berdo, P.C.

(57) ABSTRACT

The present disclosure relates generally to a wireless communication system. More particularly, the present disclosure relates to an apparatus and a method for applying a service-based interface for user traffic processing in a wireless communication system. An operation method of a user plane function (UPF) in a wireless communication system includes: transmitting information on the UPF to a network repository function (NRF) to register a service of the UPF in the NRF, wherein the information on the UPF includes a universally unique identifier (UUID), and information on the service provided by the UPF; and receiving the information on the registered service of the UPF from the NRF.

18 Claims, 10 Drawing Sheets

(56)                 References Cited

U.S. PATENT DOCUMENTS

| | | | |
|---|---|---|---|
| 2019/0007992 A1 | 1/2019 | Kim et al. | |
| 2019/0059067 A1 | 2/2019 | Lee et al. | |
| 2020/0288480 A1 * | 9/2020 | Kim | H04L 67/02 |
| 2021/0036837 A1 | 2/2021 | Huang et al. | |
| 2021/0184989 A1 * | 6/2021 | Wu | H04L 47/762 |
| 2021/0368373 A1 * | 11/2021 | Youn | H04W 76/16 |
| 2022/0182896 A1 * | 6/2022 | Talebi Fard | H04W 36/0085 |
| 2023/0073437 A1 * | 3/2023 | Wang | G06F 16/9577 |
| 2023/0300215 A1 * | 9/2023 | Bartolome Rodrigo | H04L 67/51 |
| | | | 709/203 |
| 2023/0362024 A1 * | 11/2023 | Wikström | H04L 12/1407 |
| 2024/0179801 A1 * | 5/2024 | Wang | H04W 4/06 |

FOREIGN PATENT DOCUMENTS

| | | | |
|---|---|---|---|
| KR | 10-2178348 B1 | 11/2020 | |
| WO | 2020166881 A1 | 8/2020 | |
| WO | 2020232404 A1 | 11/2020 | |

OTHER PUBLICATIONS

3GPP TS 29.502 V16.6.0 (Dec. 2020), 3rd Generation Partnership Project; Technical Specification Group Core Network and Terminals; 5G System; Session Management Services; Stage 3 (Release 16), pp. 1-280.

3GPP, TS23.501 v16.11.0, "System architecture for the 5G System (5GS)", Stage 2, 3GPP (Dec. 23, 2021).

* cited by examiner

FIG. 6

| Query parameter | |
|---|---|
| Attribute | Explanation |
| target-nf-type | type of NF intended to be found (e.g., UPF) |
| service-names | service name intended to be found (e.g., Nupf_EventExposure) |
| snssais | pieces of SNSSAI supported by NF intended to be found |
| dnn | DNN supported by NF intended to be found |
| tai | TAI supported by NF intended to be found |
| pdu-session-types | session type supported by NF intended to be found |

| Name | Length (bytes) | Length (hex digits) | Example | Contents |
|---|---|---|---|---|
| time_low | 4 | 8 | 4947a69a | lower 32 bits of time value |
| time_mid | 2 | 4 | f61b | middle 16 bits of time value |
| time_hi_and_version | 2 | 4 | 4bc1 | 4-bit version value and upper 12 bits of time value |
| clock_seq_hi_and_res clock_seq_low | 2 | 4 | b9da | variant indicator of 1 to 3 bits and clock value of 13 to 15 bits |
| node | 6 | 12 | 47c9c5d14b64 | 48-bit node ID |

FIG. 8

| NFProfile | |
|---|---|
| Attribute | Explanation |
| nfInstanceId | instance ID (UUID) of NF |
| nfType | type of NF (e.g., UPF) |
| fqdn | FQDN (e.g., UPF.3gpp.org) of NF |
| ipv4Addresses | IPv4 address of NF |
| ipv6Addresses | IPv6 address of NF |
| capacity | capacity of NF |
| load | current load of NF |
| loadTimeStamp | time of current load of NF |
| upfInfo | detailed information of UPF |
| nfServices | service that NF provides (e.g., Nupf_EventExposure) |

FIG. 9

| upfInfo | |
|---|---|
| Attribute | Explanation |
| sNssaiUpfInfoList | information on SNSSAI and DNN that UPF supports |
| smfServingArea | SMF service area that UPF supports |
| interfaceUpfInfoList | interfaces set in UPF |
| pduSessionTypes | session type that UPF supports |
| atsssCapability | ATSSS capability that UPF supports |
| ueIpAddrInd | whether UPF allocates IP address |
| taiList | TAIs that UPF supports |

FIG. 10

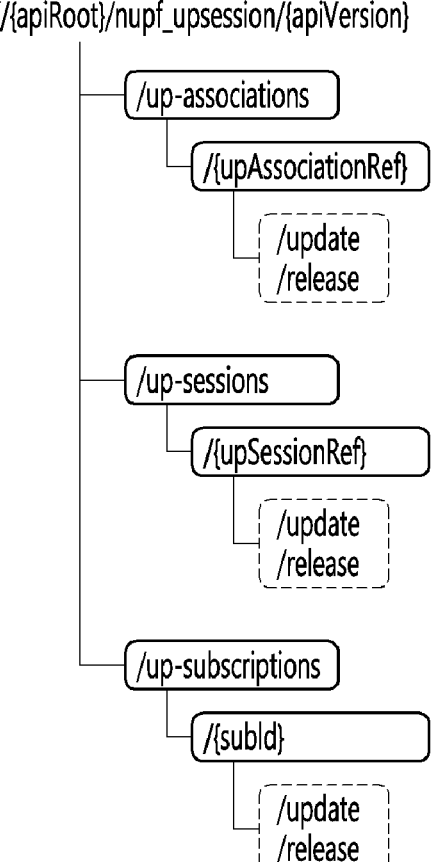

FIG. 11A                          FIG. 11B
FIG. 12
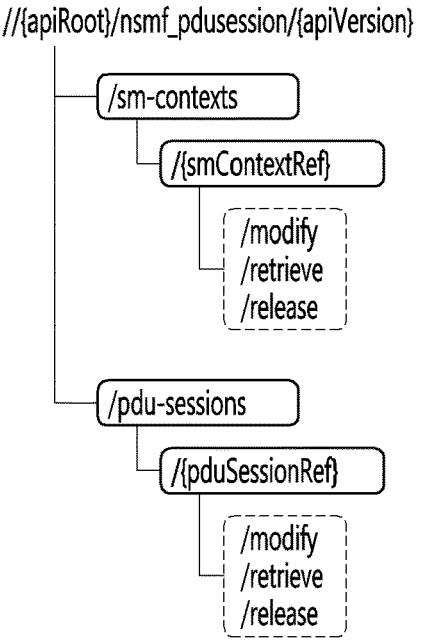

//{apiRoot}/nsmf_pdusession/{apiVersion}

/sm-contexts

/{smContextRef}

/modify
/retrieve
/release
/report

/pdu-sessions

/{pduSessionRef}

/modify
/retrieve
/release
/report

//{apiRoot}/nsmf_cpassociation/{apiVersion}

/cp-associations

/{cpAssociationRef}

/report

APPARATUS AND METHOD FOR APPLYING SERVICE-BASED INTERFACE FOR USER TRAFFIC PROCESSING IN WIRELESS COMMUNICATION SYSTEM

CROSS REFERENCE TO RELATED APPLICATION

The present application claims priority to Korean Patent Application No. 10-2022-0013489, filed Jan. 28, 2022 and Korean Patent Application No. 10-2022-0057368, filed May 10, 2022 and Korean Patent Application No. 10-2023-0003093, filed Jan. 9, 2023, the entire contents of which is incorporated herein for all purposes by this reference.

BACKGROUND OF THE INVENTION

Field of the Invention

The present disclosure relates generally to a wireless communication system. More particularly, the present disclosure relates to an apparatus and a method for applying a service-based interface for user traffic processing in a wireless communication system.

Description of the Related Art

In a wireless communication system, a service-based architecture (SBA) may be applied for an independent and reusable modular framework. Each network function (NF) of a 5G network control plane may serve as a service consumer or service provider. A service provider exposes its service, and a service consumer that has an authority to access the service may use the service with a service-based interface (SBI).

The foregoing is intended merely to aid in the understanding of the background of the present disclosure, and is not intended to mean that the present disclosure falls within the purview of the related art that is already known to those skilled in the art.

SUMMARY OF THE INVENTION

On the basis of the above description, the present disclosure provides an apparatus and a method for applying a service-based interface for user traffic processing in a wireless communication system.

In addition, the present disclosure provides an apparatus and a method for expanding a service-based architecture limited to a control plane to a user plane in a wireless communication system.

In addition, the present disclosure provides an apparatus and a method for applying a service-based architecture to a user plane by using a service-based interface with the Hypertext Transfer Protocol (HTTP) in a wireless communication system. In addition, the present disclosure provides an apparatus and a method for applying a service-based interface (SBI) to a user plane function (UPF) in a wireless communication system.

According to various embodiments of the present disclosure, there is provided an operation method of a user plane function (UPF) in a wireless communication system, the operation method including: transmitting information on the UPF to a network repository function (NRF) to register a service of the UPF in the NRF; and receiving information on the registered service of the UPF from the NRF.

According to various embodiments of the present disclosure, there is provided an operation method of a session management function (SMF) in a wireless communication system, the operation method including: transmitting information on a user plane function (UPF) as a query parameter to a network repository function (NRF); and receiving a search result from the NRF.

According to various embodiments of the present disclosure, there is provided a user plane function (UPF) in a wireless communication system, the UPF including: a transceiver; and a controller operably connected to the transceiver, wherein the controller is configured to transmit information on the UPF to a network repository function (NRF) to register a service of the UPF in the NRF, and receive information on the registered service of the UPF from the NRF.

According to various embodiments of the present disclosure, there is provided a session management function (SMF) in a wireless communication system, the SMF including: a transceiver; and a controller operably connected to the transceiver, wherein the controller is configured to transmit information on a user plane function (UPF) intended to be found, as a query parameter to a network repository function (NRF), and receive a search result from the NRF.

According to various embodiments of the present disclosure, there is provided a user plane function (UPF) in a wireless communication system, the UPF including: a transceiver; and a processor operably connected to the transceiver, wherein the processor is configured to transmit information on the UPF to a network repository function (NRF) to register a service of the UPF in the NRF, and receive information on the registered service of the UPF from the NRF, wherein the information on the UPF includes a universally unique identifier (UUID) and information on the service provided by the UPF.

According to various embodiments of the present disclosure, there is provided a session management function (SMF) in a wireless communication system, the SMF including: a processor; and a transceiver operably connected to the processor, wherein the processor is configured to transmit information on a user plane function (UPF) to a network repository function (NRF), and receive a search result of the information on the UPF, wherein the information on the UPF includes information on the UPF registered in the NRF The apparatus and the method according to the various embodiments of the present disclosure enable a service to be generated and managed in a modular and consistent manner between 5G network functions (NFs) by having a consistent interface throughout a 5G system through application of the service-based interface (SBI) to the user plane function (UPF).

Effects that may be obtained from the present disclosure will not be limited to only the above described effects. In addition, other effects which are not described herein will become apparent to those skilled in the art from the following description.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 6 illustrates an example of a query parameter according to an embodiment of the present disclosure.

FIG. 7 illustrates an example of a UUID according to an embodiment of the present disclosure.

FIG. 8 illustrates an example of NFProfile according to an embodiment of the present disclosure.

FIG. 9 illustrates an example of upfInfo included in NFProfile according to an embodiment of the present disclosure.

FIG. 10 illustrates a first example of UPF API resource configuration providing SBI according to an embodiment of the present disclosure.

FIG. 11A and FIG. 11B illustrate a second example of UPF API resource configuration providing SBI according to an embodiment of the present disclosure.

FIG. 12 illustrates a part of a conventional SMF API resource configuration according to various embodiments of the present disclosure.

DETAILED DESCRIPTION OF THE INVENTION

The terms used in the present disclosure are merely used to describe a particular embodiment, and are not intended to limit the scope of another embodiment. An expression used in the singular encompasses the expression of the plural, unless it has a clearly different meaning in the context. All the teams including technical and scientific terms used herein have the same meaning as commonly understood by those skilled in the art to which the present disclosure belongs. Among the terms used in the present disclosure, the terms defined in a general dictionary may be interpreted to have the meanings the same as or similar to the contextual meanings in the relevant art, and are not to be interpreted to have ideal or excessively formal meanings unless explicitly defined in the present disclosure. In some cases, even the terms defined in the present disclosure should not be interpreted to exclude the embodiments of the present disclosure.

In various embodiments of the present disclosure to be described below, a hardware approach will be described as an example. However, the various embodiments of the present disclosure include a technology using both hardware and software, so the various embodiments of the present disclosure do not exclude a software-based approach.

Hereinafter, the present disclosure relates to an apparatus and a method for applying a service-based interface for user traffic processing in a wireless communication system. Specifically, the present disclosure describes a technology for generating and managing a service in a modular and consistent manner between 5G network functions (NFs) by having a consistent interface throughout a 5G system through application of a serviced-based interface (SBI) to a user plane function (UPF) in a wireless communication system.

The terms referring to signals, the terms referring to channels, the terms referring to control information, the terms referring to network entities, the terms referring to elements of an apparatus, and the like used in the description below are only examples for the convenience of description. Accordingly, the present disclosure is not limited to the tams described below, and the tams may be replaced by other terms having the same technical meanings.

In addition, various embodiments of the present disclosure are described using terms used in some communication standards (e.g., the 3rd Generation Partnership Project (3GPP)), but the embodiments are only examples for description. The various embodiments of the present disclosure may be easily modified and applied to other communication systems.

Figure 1:
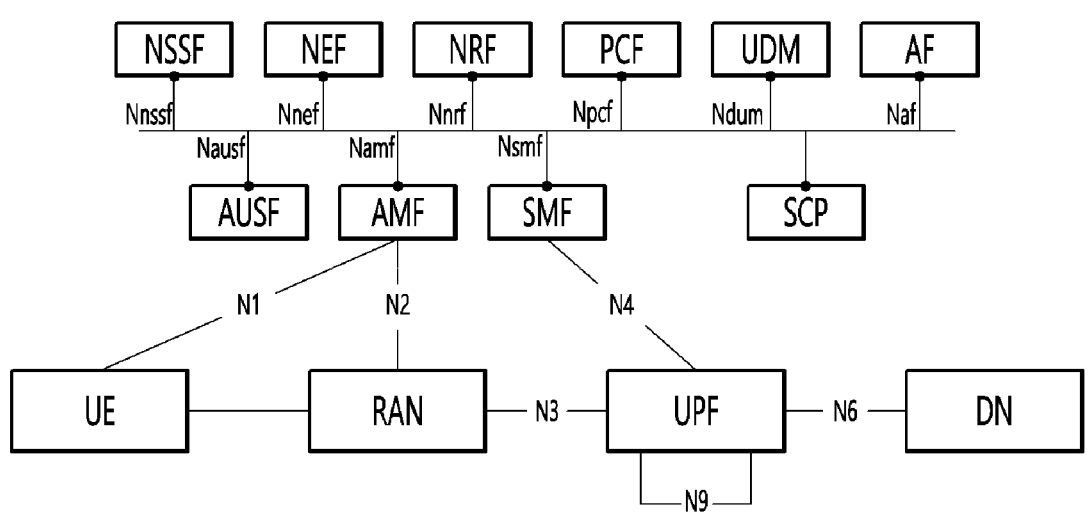
FIG. 1 illustrates a conventional 5G network architecture according to a service based architecture (SBA) according to various embodiments of the present disclosure.

FIG. 1 shows a conventional 5G network architecture according to a service-based architecture (SBA) according to various embodiments of the present disclosure.

Referring to FIG. 1, the conventional 5G network architecture may include a network slice selection function (NSSF), a network exposure function (NEF), a network repository function (NRF), a policy control function (PCF), a unified data management (UDM), an application function (AF), an authentication server function (AUSF), an access and mobility management function (MF), a session management function (SMF), and the like that are network functions (NFs).

The NFs may be operated by an entity including a transceiver, a memory, and a processor. However, no limitation to elements of the transceiver, the memory, and the processor is imposed. The processor, the transceiver, and the memory may be realized as a single chip, and at least one processor may be included.

The transceiver collectively refers to a receiver of a network entity and a transmitter of the network entity, and may transmit and receive signals to and from a base station. The signals transmitted to and received from the base station may include control information and data. To this end, the transceiver may include an RF transmitter and an RF receiver. The RF transmitter up-converts and amplifies the frequency of a transmitted signal. The RF receiver performs low-noise amplification of a received signal and down-converts the frequency. However, this is only an example of the transceiver, and the elements of the transceiver are not limited to the RF transmitter and the RF receiver. In addition, the transceiver may receive signals through a wireless channel and output the signals to the processor, and may transmit signals output from the processor, through the wireless channel. The memory may store therein a program and data required for the operation of the network entity. In addition, the memory may store therein control information or data included in a signal obtained from the network entity. The memory may be a storage medium, such as ROM, RAM, a hard disk, a CD-ROM, and a DVD, or a combination thereof. The processor may control a series of steps so that the network entity operates according to the above-described embodiment of the present disclosure. For example, the processor may receive control signals and data signals through the transceiver, and may process the received control signals and data signals. Furthermore, the processor may transmit the processed control signals and data signals through the transceiver.

The NFs may interface with each other using a service-based interface (SBI). Each of the NFs may use a method in which a particular NF registers its own service in the NRF and makes a request for registration to the NRF about a service that the particular NF will provide, and according to a response to the request, requests the NF to provide the service. A user plane function (UPF) is a function of processing user data traffic, connects a radio access network (RAN) with a data network (DN), and may interwork with other UPF.

The network repository function (NRF) maintains records of available NF instances and supported services, and when receiving a request for searching for a particular service from another NF, the NRF may provide information on the NF instance providing the particular service. In addition, if a request for subscription to a particular service is received from another NF, the NRF may provide a notification to the NF instance that has subscribed to the particular service when the particular service is registered.

In the conventional 5G network architecture, the network functions excluding the UPF have the service-based interface, but the UPF does not have the service-based interface. Because of this, in the conventional 5G network architecture, the SBI is applied only between the NFs of the control plane, and the SBI is not applied to the UPF, which is the network function of the user plane, and the UPF is based on communication with the SMF using Packet Forwarding Control Protocol (PFCP) of 3GPP TS29.244, so there is a problem of not having a consistent interface structure between the 5G network functions.

To solve this problem, the present disclosure relates to an apparatus and a method for generating and managing a service in a modular and consistent manner between 5G NFs by having a consistent interface throughout a 5G system through application of a service-based interface to a user plane. Specifically, according to the present disclosure, in order to apply the SBI to the UPF, the UPF may be registered in the NRF, a resource collection of the UPF may be defined, and a service of the UPF may be defined.

Figure 2:
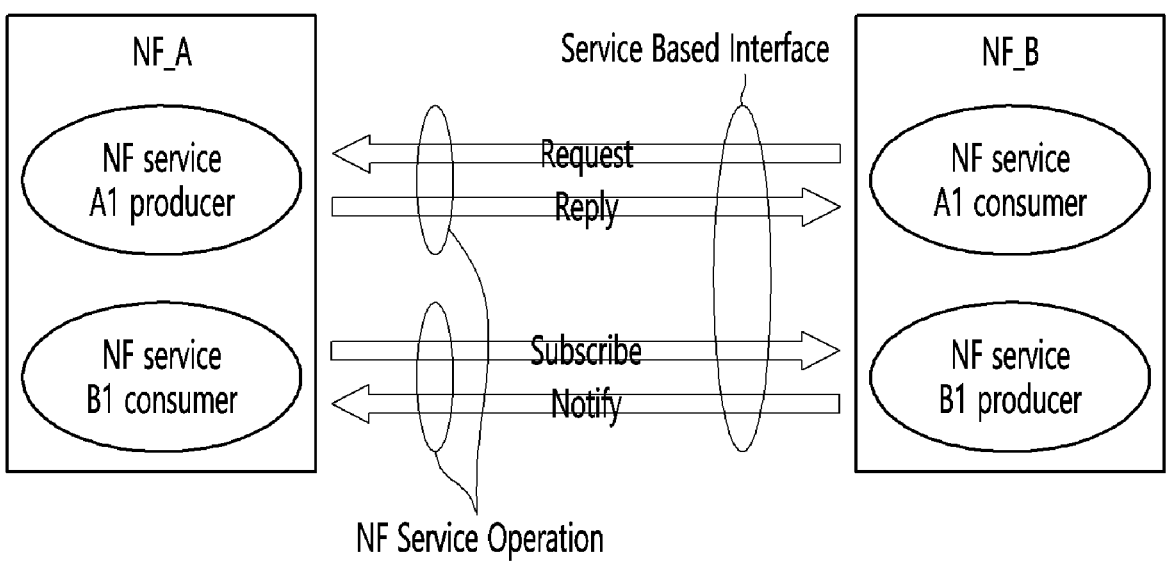
FIG. 2 illustrates an example of a service-based interface according to various embodiments of the present disclosure.

FIG. 2 shows an example of a service-based interface according to various embodiments of the present disclosure.

Referring to FIG. 2, the NFs, the NSSF, NEF, NRF, PCF, UDM, AF, AUSF, AMF, SMF, and the like, shown in FIG. 1 may use the service operation shown in FIG. 2 therebetween. For example, NF_B, a consumer of service A1, may request NF_A providing the service A1 for a service and may receive a response. NF_A, a consumer of service B1, may subscribe to the service B1 from NF_B, a service provider of the service B1. When an event to which NF_A has subscribed occurs in the service, NF_B provides a notification to NF_A.

Figure 3:
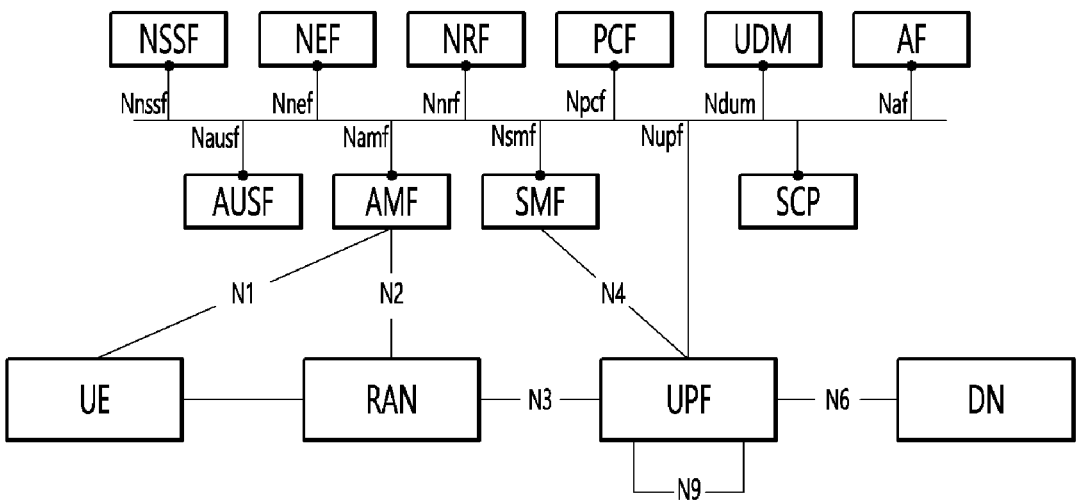
FIG. 3 illustrates a 5G network structure in which SBI is applied to UPF according to various embodiments of the present disclosure.

FIG. 3 shows a 5G network architecture in which an SBI is applied to an UPF, according to various embodiments of the present disclosure.

Referring to FIG. 3, since the SBI is applied to the UPF in the 5G network architecture shown in FIG. 3, the UPF may provide and receive a service-based interface service in a manner shown in FIG. 2. The UPF may register its service in an NRF, may make a request for registration to the NRF about a service that the UPF will provide, may receive a response to the request, and may use the SBI to make a request to the NF for the desired service. The UPF may provide the SBI together with the PFCP, which is a conventional N4 interface.

Figure 4:
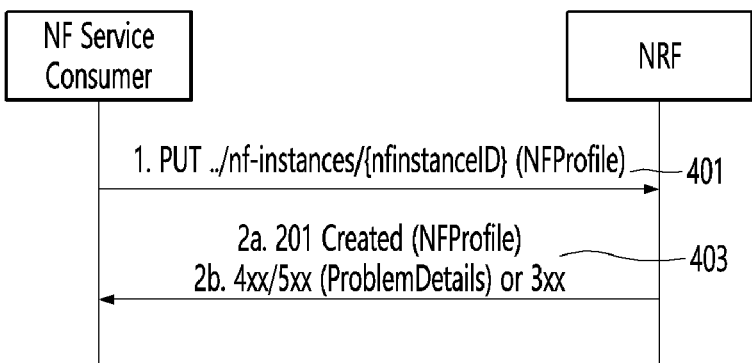
FIG. 4 is a signal flow diagram for an operation of registering an NF Service Consumer in an NRF according to an embodiment of the present disclosure. NF Service Consumer of FIG. 4 may include UPF.

FIG. 4 shows a signal flowchart of the operation of registration in an NRF by an NF service consumer according to an embodiment of the present disclosure. The NF service consumer shown in FIG. 4 may include an UPF.

Referring to FIG. 4, the NF service consumer may use {nfInstanceID} and NFProfile to register its own service in the NRF in operation 401. According to an embodiment, the NF service consumer may include the UPF, and may be a user of service Nnrf_NFManagement.

{nfInstanceID} may be an instance identifier of the UPF expressed in the form of a universally unique identifier (UUID).

NFProfile is a service profile of the UPF and may include information on the service that the UPF provides.

In response to service registration in operation 401, the NRF may transmit NFProfile to the NF service consumer in operation 403. NFProfile will be described in detail with reference to FIG. 8.

According to an embodiment, when service registration in the NRF fails in operation 401, the NRF may transmit information on the reason for the failure to the UPF, which is the NF service consumer.

Figure 5:
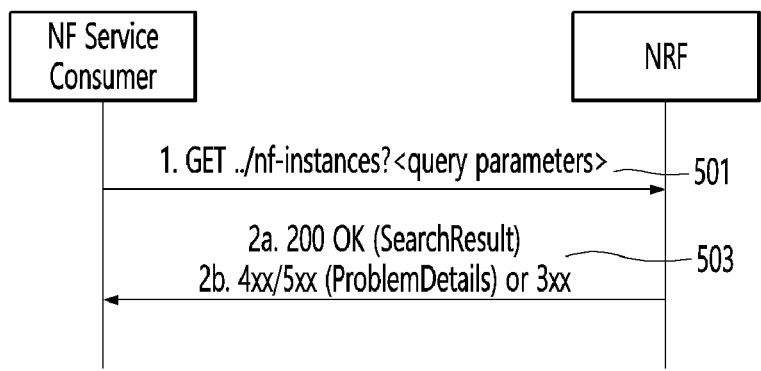
FIG. 5 illustrates a signal flow diagram for an operation for retrieving a UPF from an NRF according to an embodiment of the present disclosure.

FIG. 5 shows a signal flowchart of the operation of searching an NRF for an UPF according to an embodiment of the present disclosure. The NF service consumer shown in FIG. 5 may include an SMF.

Referring to FIG. 5, when the NF service consumer searches for information intended to be found using a query parameter, the NRF may transmit a search result.

The NF service consumer may put information related to the UPF intended to be found into the query parameter and may transmit the query parameter to the NRF in operation 501. According to an embodiment, the NF service consumer may include the SMF.

The NRF may transmit SearchResult including a search result of operation 501 to the NF service consumer in operation 503. According to an embodiment, SearchResult may include time during which the found NF is valid, and NFProfile. NFProfile may be NFProfile registered by the UPF of FIG. 4.

According to an embodiment, when it fails to find the information received as the query parameter in operation 501, the NRF may transmit information on the reason for the failure to the NF service consumer.

According to an embodiment, FIGS. 4 and 5 may be applied in the same manner to a case in which an SMF registers its instance ID and profile and an UPF searches for the SMF. FIG. 6 shows an example of a query parameter, according to an embodiment of the present disclosure.

Referring to FIG. 6, the query parameter may be used when an NRF is searched for an UPF using service Nnrf_NFDiscovery. When any NF including an SMF wants to find an UPF, searching may be performed with the query as shown in FIG. 5.

According to an embodiment, the query parameter may include target-nf-type, service-names, snssais, dnn, tai, and pdu-session-types.

target-nf-type may be a type of an NF intended to be found. For example, the type may be an UPF.

service-names may be a service name intended to be found. For example, the service name may be Nupf_EventExposure.

Snssais may be pieces of single network slice selection assistance information (SNSSAI) supported by an NF intended to be found.

Dnn may be a data network name (DNN) supported by an NF intended to be found.

Tai may be a tracking area identity (TAI) supported by an NF intended to be found.

pdu-session-types may be a session type supported by an NF intended to be found.

FIG. 7 shows an example of an UUID, according to an embodiment of the present disclosure.

Referring to FIG. 7, the UUID may be used as nfInstanceId. The UUID is a 128-bit identifier and may be unique to identify an UPF.

For example, assuming that the UUID is 4947a69a-f61b-4bc1-b9da-47c9c5d14b64, 4947a69a may be the lower 32 bits of the time value, f61b may be the middle 16 bits of the time value, 4bc1 may be a 4-bit version value and the upper 12 bits of the time value, b9da may be a variant indicator of 1 to 3 bits and a clock value of 13 to 15 bits, and 47c9c5d14b64 may be a 48-bit node ID.

FIG. 8 shows an example of NFProfile, according to an embodiment of the present disclosure.

Referring to FIG. 8, NFProfile may be used to register an UPF in an NRF using service Nnrf_NFManagement or may be used to search the NRF for the UPF using service Nnrf_NFDiscovery. In addition, when the UPF registers its service as shown in FIG. 4, the UPF may use NFProfile to register nfServices, a service that the UPF provides, together with other information on the UPF. The NRF may transmit NFProfile of the UPF to the NF that searches for the UPF or for nfServices registered by the UPF.

According to an embodiment, NFProfile may include nfInstanceId, nfType, fqdn, ipv4Addresses, ipv6Addresses, capacity, load, loadTimeStamp, upfInfo, and nfServices.

nfInstanceId may be an instance ID (UUID) of an NF.

nfType may be a type of an NF (e.g., UPF).

fqdn may be a full qualified domain name (FQDN) (e.g., UPF.3gpp.org) of an NF.

ipv4Addresses may be an IPv4 address of an NF.

ipv6Addresses may be an IPv6 address of an NF.

capacity may be a capacity of an NF.

load may be a current load of an NF.

loadTimeStamp may be the time of a current load of an NF.

upfInfo may be detailed information of an UPF.

nfServices may be a service that an NF provides. For example, in the case of NFProfile of the UPF, the service may be Nupf_EventExposure that refers to a service in which the UPF provides its data to the outside.

FIG. 9 shows an example of upfInfo included in NFProfile according to an embodiment of the present disclosure. NFProfile may be NFProfile of FIG. 8.

Referring to FIG. 9, when the UPF registers its service as shown in FIG. 4, the UPF may register setting information of the UPF as the UPFInfo included in NFProfile. When a user of the service of the UPF searches for nfServices registered by the UPF, an NRF may transmit UPFInfo included in NFProfile.

According to an embodiment, UPFInfo may include sNssaiUpfInfoList, smfServingArea, interfaceUpfInfoList, pduSessionTypes, atsssCapability, ueIpAddrInd, and taiList.

sNssaiUpfInfoList may be information on an SNSSAI and a DNN that the UPF supports.

smfServingArea may be a service area of an SMF controlling the UPF.

interfaceUpfInfoList may be interfaces set in the UPF.

pduSessionTypes may be a session type that the UPF supports.

atsssCapability may be access traffic steering, switching, splitting (ATSSS) capability that the UPF supports.

ueIpAddrInd may be information on whether the UPF allocates an IP address.

taiList may be TAIs that the UPF supports.

FIG. 10 shows a first example of an UPF API resource configuration providing an SBI according to an embodiment of the present disclosure.

Referring to FIG. 10, apiRoot corresponds to fqdn, ip4address, and ip6address of NFProfile shown in FIG. 8 and may be UPF.3gpp.org, for example. apiVersion, such as v1 or v2, may indicate the version of the service. A user traffic processing service that the UPF provides is represented as Nupf_UPSession, and service Nupf_UPSession may have three resource collections: up-associations, up-sessions, and up-subscriptions. Distinguishing within the up-associations collection is performed with upAssociationRef, and upAssociationRef may indicate a association to any one NF (e.g., SMF) connected to the UPF. When an UPF having apiRoot is connected with one SMF, upAssociationRef may be allocated for management. When association to the UPF is completed, the SMF may receive upAssociationRef to the UPF, and may use upAssociationRef to perform update for required update for association to the UPF, and release for deletion. In addition, distinguishing within the up-sessions collection is performed with upSessionRef, and upSessionRef may identify an individual session supported within the UPF. When an SMF request an UPF having apiRoot to create a session, upSessionRef may be allocated for management. When the request to the UPF for session creation succeeds, the SMF may receive upSessionRef for the session, and may use upSessionRef to perform update or deletion for operation required for the session. Distinguishing within the up-subscriptions collection may be performed with subId, and subId may indicate subscription correlation information for which the UPF is requested to provide information. When an UPF having apiRoot receives requests for subscription from NFs (e.g., SMF), subId may be allocated for management. An NF making a request to an UPF for subscription, when the request to the UPF for subscription succeeds, may receive subId for the subscription, and may use subId to perform modify or release (unsubscribe or release) for the subscription.

The mixed use of the terms of release and delete for deletion in up-associations, up-sessions, and up-subscriptions shown in FIG. 10 is merely using conventionally used terms as they are, and no limitation thereto is imposed.

Regarding the terms of up-associations and upAssociationRef in FIG. 10, up-associations is merely used as a representative name for associations with NFs maintaining associations with an UPF, and upAssociationRef is merely used as an identifier or reference information for association with an individual NF. No limitation thereto is imposed, and any terms representing association may be used.

Regarding the terms up-sessions and upSessionRef in FIG. 10, up-sessions is merely used as a representative name that collectively represents sessions supported by an UPF, and upSessionRef is merely used as an identifier or reference information for an individual session. No limitation thereto is imposed, and any terms representing sessions may be used.

Regarding the terms up-subscription and subId in FIG. 10, up-subscription is merely used as a representative name that represents subscriptions to a service exposed by an UPF to other NFs, and subId is merely used as an identifier or reference information for individual subscription. No limitation thereto is imposed, and any terms representing service subscription may be used.

FIGS. 11A and 11B show a second example of an UPF API resource configuration providing an SBI according to an embodiment of the present disclosure.

Referring to FIGS. 11A and 11B, FIG. 10 shows an example in which one service Nupf_UPSession is configured with three resource collections, but FIGS. 11A and 11B show an example in which Nupf_UPAssociation, Nupf_UPSession, and Nupf_EventExposure are configured as different services. Other details may be the same as those described with reference to FIG. 10.

According to an embodiment, as an URI for using service Nupf_UPAssociations, //{apiRoot}/nupf_upassociation/{apiVersion}/up-associations or //{apiRoot}/nupf_upassociation/{apiVersion} may be used. As an URI for using an individual upAssociationRef, //{apiRoot}/nupf_upassciation/{apiVersion}/up-assocations/{upAssociationRef} or //{apiRoot}/nupf_upassciation/{apiVersion}/{upAssociationRef} may be used. As URIs for update and release, //{apiRoot}/nupf_upassciation/{apiVersion}/up-assocations/{upAssociationRef}/update and //{apiRoot}/nupf_upassciation/{apiVersion}/up-assocations/{upAssociationRef}/release may be used, or //{apiRoot}/nupf_upassciation/{apiVersion}/{upAssociationRef}/update and //{apiRoot}/nupf_upassciation/{apiVersion}/{upAssociationRef}/release may be used.

In addition, according to an embodiment, regarding URIs for update and release, update and deletion information in //{apiRoot}/nupf_upassciation/{apiVersion}/up-assocations/{upAssociationRef} or //{apiRoot}/nupf_upassciation/{apiVersion}/{upAssociationRef} may be provided as user data by a service consumer accessing the URIs.

According to an embodiment, as an URI for using service Nupf_UPSessions, //{apiRoot}/nupf_upsession/{apiVersion}/up-sessions or //{apiRoot}/nupf_upsession/{apiVersion} may be used. As an URI for using an individual upSessionRef, //{apiRoot}/nupf_upsession/{apiVersion}/ up-sessions/{upSessionRef} or //{apiRoot}/nupf_upsession/{apiVersion}/{upSessionRef} may be used.

In addition, according to an embodiment, as URIs for modification and deletion, //{apiRoot}/nupf_upsession/{apiVersion}/up-sessions/{upSessionRef}/update and //{apiRoot}/nupf_upsession/{apiVersion}/up-sessions/{upSessionRef}/delete may be used, or //{apiRoot}/nupf_upsession/{apiVersion}/{upSessionRef}/update and //{apiRoot}/nupf_upsession/{apiVersion}/{upSessionRef}/delete may be used.

In addition, according to an embodiment, regarding URIs for modification and deletion //{apiRoot}/nupf_session/{apiVersion}/up-sessions/{upSessionRef} or //{apiRoot}/nupf_session/{apiVersion}/{upSessionRef} may be provided as user data by a service consumer accessing the URIs.

In FIG. 10, a subscription service using the up-subscriptions collection of service Nupf_upsession may be expressed as service Nupf Event Exposure.

According to an embodiment, as an URI for using the subscription service, //{apiRoot}/nupf event exposure/{apiVersion}/up-subscriptions or //{apiRoot}/nupf event exposure/{apiVersion} may be used.

In addition, according to an embodiment, as an URI for using an individual {subId}, //{apiRoot}/nupf event exposure/{apiVersion}/up-subscriptions/{subId} or //{apiRoot}/nupf event exposure/{apiVersion}/{subId} may be used.

In addition, according to an embodiment, as URIs for modification and deletion, //{apiRoot}/nupf event exposure/{apiVersion}/up-subscriptions/{subId}/update and //{apiRoot}/nupf event exposure/{apiVersion}/up-subscriptions/{subId}/delete may be used, or //{apiRoot}/nupf event exposure/{apiVersion}/{subId}/update and //{apiRoot}/nupf event exposure/{apiVersion}/{subId}/delete may be used. In addition, regarding URIs for modification and deletion //{apiRoot}/nupf event exposure/{apiVersion}/up-subscriptions/{subId} or //{apiRoot}/nupf event exposure/{apiVersion}/{subId} may be provided as user data by a service consumer accessing the URIs.

In FIGS. 11A and 11B, the keywords used to construct the URIs are examples of terms representing services and information required to use the services. No limitation thereto is imposed, and various terms representing service subscription may be used instead.

FIG. 12 shows part of a conventional SMF API resource configuration according to various embodiments of the present disclosure.

Referring to FIG. 12, service Nsmf_PDUSession provided by an SMF shown in FIG. 12 has sm-contexts and pdu-sessions resource collections, and within the resource collections, sm-contexts and pdu-sessions may be distinguished with smContextRef and pduSessionRef, respectively. A user of service Nsmf_PDUSession may perform modification, retrieval, and release as operation for the context or session.

Figure 13:
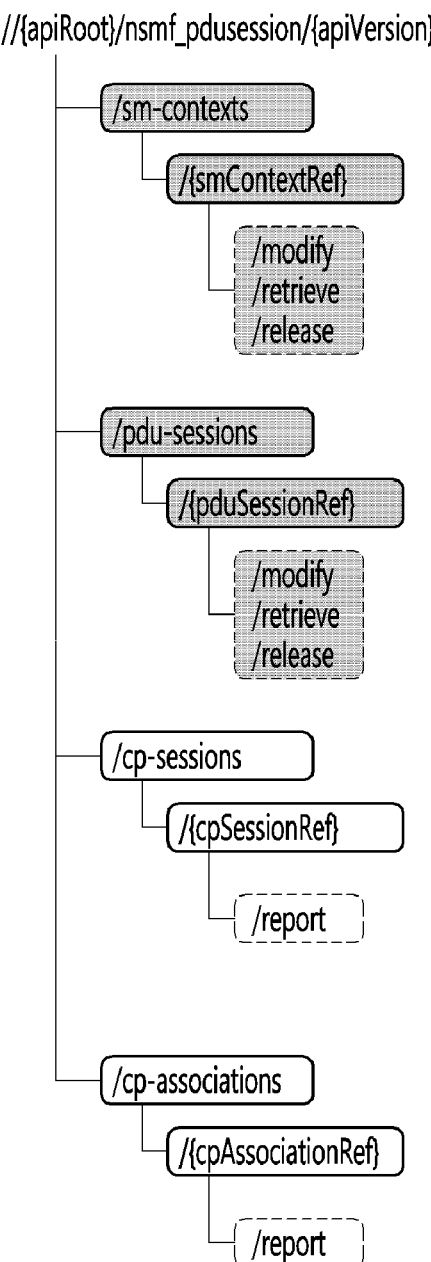
FIG. 13 illustrates a first example of configuration of SMF API resources to be changed to support SBI service in UPF according to various embodiments of the present disclosure.

FIG. 13 shows a first example of a configuration of an SMF API resource to be changed for an UPF to support an SBI service according to various embodiments of the present disclosure.

Referring to FIG. 13, an SMF may add cp-sessions and cp-associations resource collections in addition to conventional sm-contexts and pdu-sessions resource collections. The cp-sessions resource collection may correspond to the up-sessions resource collection shown in FIGS. 10, 11A and 11B, and the cp-associations resource collection may correspond to the up-associations resource collection shown in FIGS. 10, 11A and 11B. Association between the SMF and the UPF needs to be managed mutually. The SMF may manage association with cpAssocioationRef, and the UPF shown in FIGS. 10, 11A and 11B may manage association with upAssociotionRef. In addition, the SMF may manage a session with cpSessionRef, and the UPF shown in FIGS. 10, 11A and 11B may manage a session with upSessionRef. When requesting the UPF to create a session, the SMF provides //apiRoot/nsmf_pdusession/{apiVersion}/cp-sessions/{cpSessionRef}/report as an URI for receiving a notification as a callback. Afterward, the UPF may report a reporting matter related to the session through a notification URI. In addition, when requesting the UPF to create a association, the SMF provides //apiRoot/nsmf_pdusession/{apiVersion}/cp-associations/{cpAssociationRef}/report as an URI for receiving a notification as a callback. Afterward, the UPF may report a reporting matter related to the association through the notification URI.

In addition, when the SMF requests the UPF to create or modify a session or when the SMF requests the UPF to create or modify a association, an URI for receiving a notification as a callback may be set to include an address of another network function, such as PCF, NWDAF, or AF, rather than the SMF such that the notification is directly forwarded to the network function.

Figure 14:
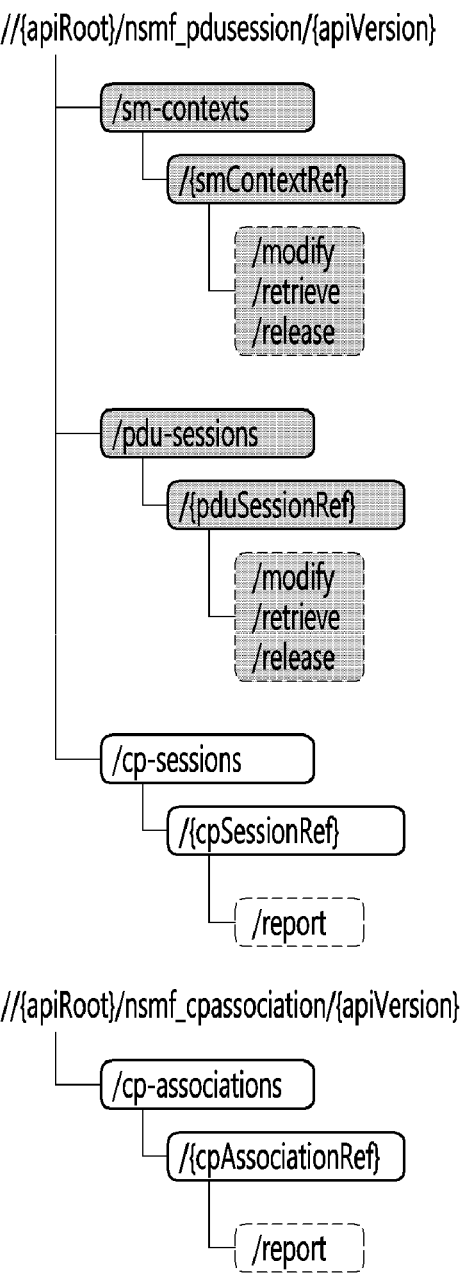
FIG. 14 illustrates a second example of a configuration of an SMF API resource to be changed to support an SBI service in UPF according to various embodiments of the present disclosure.

FIG. 14 shows a second example of a configuration of an SMF API resource to be changed for an UPF to support an SBI service according to various embodiments of the present disclosure.

Referring to FIG. 14, FIG. 13 shows an example in which two resource collections, the cp-sessions and cp-associations resource collections, are added to conventional service Nsmf_PDUSession, but FIG. 14 shows an example in which the cp-sessions resource collection is added to service Nsmf_PDUSession and the cp-associations resource collection is separated into service Nsmf_CPAssociation. Accordingly, the notification URI forwarded when a association to the UPF is created may be changed to //apiRoot/nsmf_cpassociation/{apiVersion}/cp-associations/{cpAssociationRef}/report compared to //apiRoot/nsmf_pdusession/{apiVersion}/cp-associations/{cpAssociationRef}/report shown in FIG. 13. Other details may be the same as those described with reference to FIG. 13.

Figure 15:
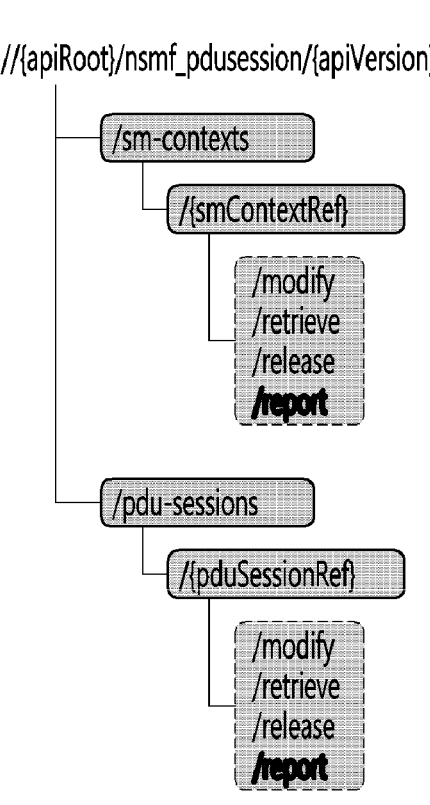
FIG. 15 illustrates a third example of configuration of SMF API resources to be changed to support SBI service in UPF according to various embodiments of the present disclosure.

FIG. 15 shows a third example of a configuration of an SMF API resource to be changed for an UPF to support an SBI service according to various embodiments of the present disclosure.

Referring to FIG. 15, FIG. 15 shows an example in which the cp-sessions resource collection is not added to conventional service Nsmf_PDUSession and/report operation is added to the conventional sm-contexts resource collection or pdu-sessions resource collection. In this case, {cpSessionRef} in FIG. 14 may be changed with {smContextRef} or {pduSessionRef}. Accordingly, the notification URI forwarded when a session to the UPF is created may be changed from //apiRoot/nsmf_pdusession/{apiVersion}/cp-sessions/{cpSessionRef}/report to //apiRoot/nsmf_pdusession/{apiVersion}/sm-contexts/{pduSessionRef}/report or //apiRoot/nsmf_pdusession/{apiVersion}/pdu-sessions/{pduSessionRef}/report. Other details may be the same as those described with reference to FIG. 13.

Compared to FIG. 12, modifications shown in FIGS. 13, 14, and 15 are possible in the present disclosure, but hereinafter, a description will be given based on the example shown in FIG. 12.

Figure 16:
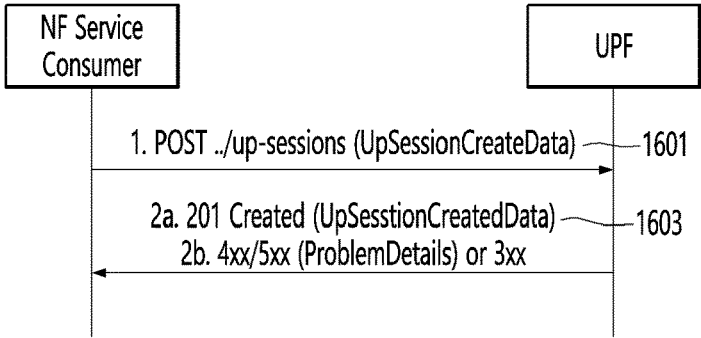
FIG. 16 is a signal flow diagram for an operation of requesting session creation with UPF according to an embodiment of the present disclosure.
Figure 20:
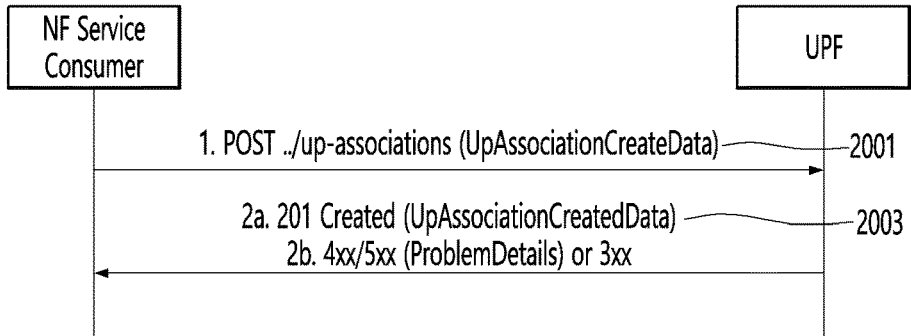
FIG. 20 is a signal flow diagram for an operation of requesting association creation with UPF according to an embodiment of the present disclosure.

FIG. 16 shows a signal flowchart of the operation of requesting an UPF to create a session according to an embodiment of the present disclosure. The NF service consumer shown in FIG. 16 may include an SMF. According to an embodiment, association to a UPF shown in FIG. 20 is completed in advance and then a session may be created on the basis of the association.

Referring to FIG. 16, in order to create a session, the NF service consumer may make a request to the UPF for POST of UpSessionCreateData in operation 1601. In operation 1601, UpSessionCreateData may include information required for session creation. UpSessionCreateData may include a packet detection rule (PDR), a forwarding action rule (FAR), a usage reporting rule (URR), a QoS enhancement rule (QER), a buffering action rule (BAR), a session reporting rule (SRR), a multi-access rule (MAR), PDNtype, DNN, CreateTE, CreateBridge, etc. of a session to be created. According to an embodiment, UpSessionCreateData may further include a notification URI to receive a report as a callback for the session. For example, a notification URI, such as //{apiRoot}/nsmf_pdusession/{apiVersion}/cp-sessions/{cpSesssionRef}/report, may be included directly in UpSessionCreateData or inside each information element that requests a report including the SRR. The PDR may include various types of information required for the UPF to detect a user packet flow, and identifiers for the FAR, QER, SRR, BAR, MAR, URR, etc. required and to be applied to process a detected packet. The FAR may include information required to define a method of forwarding a user packet. The QER may include information on quality control of a user packet. The SRR may include information on a matter to be reported for the session. The BAR may include information required for buffer management for a user packet flow. The MAR may include information on an ATSSS processing method. The URR may include information on reporting of usage. In addition, the MAR may include information on PDNtype required for the session, a data network name (DNN) for connecting the session, and creation of a tunnel endpoint (TE) or bridge. The CreateTE may include information for providing a TEID allocated by the SMF or entrusting the UPF with allocation of a TEID. The FAR may include instructions for creating and transmitting a packet to which a TEID is added to another device for tunneling for a user packet, and for removing a tunneling header from a packet tunneled with a TEID designated by the CreateTE. The SRR may include Access Availability Control Information, and QoS Monitoring per QoS flow Control Information. Access Availability Control Information may be used for the SMF to make a request for a report when a particular access type becomes available or unavailable. QoS Monitoring per QoS flow Control Information may be used for the SMF to make a request for a report on a QoS monitoring result for a particular QoS flow. The URR may be periodic or the SMF may make a request for a report on usage when the usage is in a particular situation.

Figure 17:
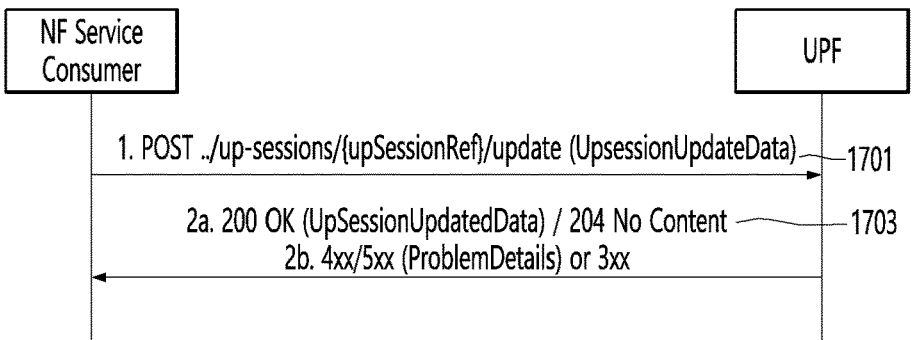
FIG. 17 illustrates a signal flow diagram of a session modification request operation to UPF according to various embodiments of the present disclosure.

When the session is successfully created in response to the request from the SMF, the UPF may include {upSessionRef} or //{apiRoot}/nupf_upsession/{apiVersion}/up-sessions/{upSesssionRef} in a location header of an HTTP header of 201 Created message and transmit the message in operation 1603. Because of the message in operation 1603, the UPF may enable the SMF to use {upSesssionRef} for subsequent operations related to the session. In addition, the message in operation 1603 may include packet data rule (PDR) information generated in UpSessionCreatedData, generated tunnel endpoint identifier (TEID) or bridge information, or time sensitive communication management information (TSCMI). When session creation fails, the reason for the failure of message session creation in operation 1603 may be added to ProblemDetails and transmitted. FIG. 17 shows a signal flowchart of the operation of requesting an UPF to modify a session according to various embodiments of the present disclosure. The NF service consumer shown in FIG. 17 may include an SMF.

Referring to FIG. 17, the SMF may make a request to the UPF for POST of UpSessionUpdateData in operation 1701 to an address obtained by adding/update to the uniform resource identifier (URI) including {upSessionRef} in the location header of the HTTP message received in operation 1603 of FIG. 16. Regarding UpSessionUpdateData in operation 1701, data required for session modification and other matters to be forwarded together may be added to UpSessionUpdateData and transmitted UpSessionUpdateData may include the PDR, FAR, URR, QER, BAR, SRR, MAR, TSCMI, etc. to be changed.

When the session is changed in response to the request from the SMF, the UPF may transmit UpSessionUpdated-Data in operation 1703. UpSessionUpdatedData may include changed PDR information and other matters to be reported together. In addition, regarding UpSessionUpdated-Data, when session modification fails, the reason for the failure of session modification may be added to Problem-Details and transmitted.

Figure 18:
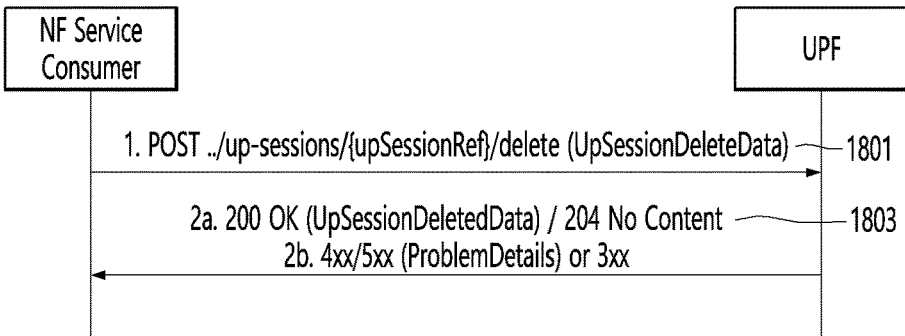
FIG. 18 is a signal flow diagram of an operation of requesting deletion of a session already created with UPF according to an embodiment of the present disclosure.

FIG. 18 shows a signal flowchart of the operation of requesting an UPF to delete a previously created session according to an embodiment of the present disclosure. The NF service consumer shown in FIG. 18 may include an SMF.

Referring to FIG. 18, the SMF may request POST of UpSessionDeleteData in operation 1801 to an address of URI adding /delete to the URI including {upSessionRef} obtained in the location header of the HTTP message received in operation 1603 of FIG. 16. Herein, UpSession-DeleteData may include data required for session deletion and other matters to be forwarded together. According to an embodiment, UpSessionDeleteData may not be used and an HTTP Body may be empty.

The UPF may transmit a report that the session has been deleted in operation 1803 in response to the request from the SMF. When performing reporting in operation 1803, UpSes-sionDeletedData may include matters to be reported together. When session deletion fails, the reason for the failure of session deletion may be added to ProblemDetails and transmitted.

Figure 19:
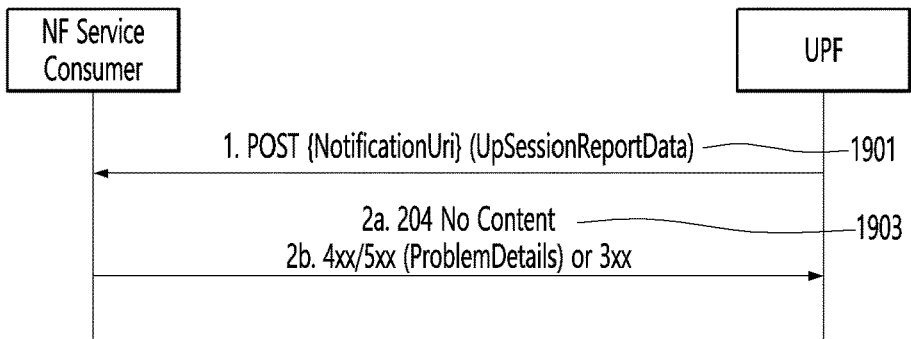
FIG. 19 is a signal flow diagram of an operation of reporting on a session through SMF according to an embodiment of the present disclosure.

FIG. 19 shows a signal flowchart of the operation of reporting on a session to an SMF or other consumer NF indicated by an SMF, according to an embodiment of the present disclosure. The NF service consumer shown in FIG. 19 may include an SMF.

Referring to FIG. 19, when a reporting matter requested by the SMF occurs in UpSessionCreateData in operation 1601 of FIG. 16, UpSessionUpdateData in operation 1701 of FIG. 17, and UpSessionReleaseData in operation 1801 of FIG. 18, an UPF may request POST of UpSessionReport-Data in operation 1901 to NotificationUri received in one of operations 1601, 1701, and 1801 of FIGS. 16, 17, and 18. In the case of occurrence of a period or an event requested to be reported with a session reporting rule (SRR), a usage reporting rule (URR), etc., UpSessionReportData in opera-tion 1801 may include the load state of the UPF according to the capability of the UPF or the degree of overload of the UPF.

The NF Service Consumer may respond without content to the data received in operation 1901, or when there is an error, the NF Service Consumer may transmit details of the error in operation 1903.

FIG. 20 shows a signal flowchart of the operation of requesting an UPF to create a association according to an embodiment of the present disclosure. The NF service consumer shown in FIG. 20 may include an SMF.

Referring to FIG. 20, in order to create a association to the UPF, the SMF may make a request to the UPF for POST of UpAssociationCreateData in operation 2001. In operation 2001, UpAssociationCreateData may include information required for association creation. UpAssociationCreateData may include Recovery Timestamp or CP Function Features, Application Packet Flow Description, and GTP-U Path QoS Control Information or Clock Drift Control Information. In addition, UpAssociationCreateData may be transmitted together with a notification URI to receive a report as a callback for the association. For example, a notification URI, such as //{apiRoot}/nsmf_pdusession/{apiVersion}/ cp-associations/{cpAssociationRef}/report, may be included directly in UpSessionCreateData or inside each piece of item data to be reported.

When the association is created in response to the request from the SMF, the UPF may include {upAssociationRef} or //{apiRoot}/nupf_upassociation/{apiVersion}/up-associa-tions/{upAssociationRef} in a location header of an HTTP header of 201 Created message and transmit the message in operation 2003. Because of operation 2003, the SMF may use {upAssociationRef} for subsequent operations related to the association. In addition, UpAssociationCreatedData may include Application Packet Flow Description generated in UpAssociationCreatedData, Recovery Timestamp or UP Function Features, and generated bridge information. According to an embodiment, when session creation fails, the reason for the failure of session creation may be added to ProblemDetails and transmitted.

Figure 21:
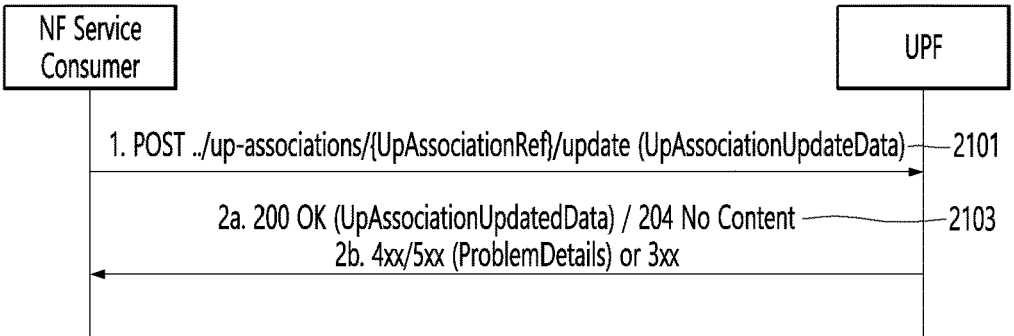
FIG. 21 is a signal flow diagram of an operation of requesting a update to an established association to UPF according to an embodiment of the present disclosure.

FIG. 21 shows a signal flowchart of the operation of requesting an UPF to update an established association according to an embodiment of the present disclosure. The NF service consumer shown in FIG. 21 may include an SMF.

Referring to FIG. 21, the SMF may request POST of UpAssociationUpdateData in operation 2101 to an address of URI adding/update to the URI included in the location header of the HTTP message received in operation 2003 of FIG. 20. UpAssociationUpdateData may be transmitted including data required for association update.

When the association is updated in response to the request from the SMF, the UPF may transmit UpAssociationUp-datedData including related information and other matters to be reported together, to the SMF in operation 2103.

According to an embodiment, when association update fails, the reason for the failure of association update may be added to ProblemDetails and transmitted by the UPF.

Figure 22:
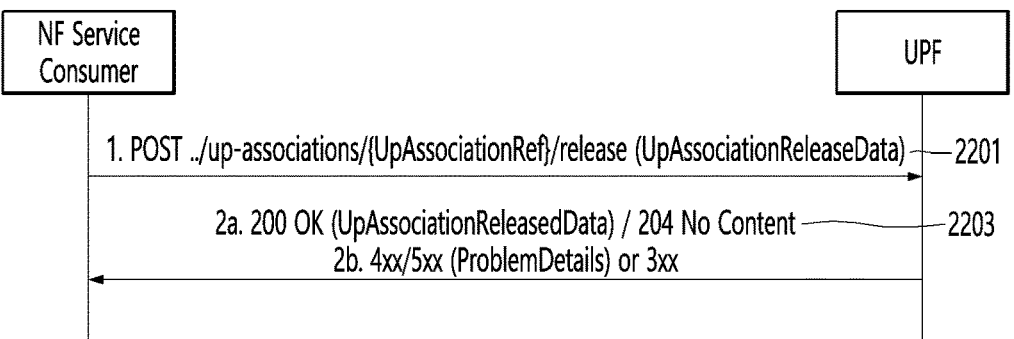
FIG. 22 is a signal flow diagram for an operation of requesting release of an established association to UPF according to an embodiment of the present disclosure.

FIG. 22 shows a signal flowchart of the operation of requesting an UPF to release an established association according to an embodiment of the present disclosure. The NF service consumer shown in FIG. 22 may include an SMF.

Referring to FIG. 22, the SMF may request POST of UpAssociationDeleteData in operation 2201 to an address obtained by adding/release to the URI included in the location header of the HTTP message received in operation 2003 of FIG. 20. UpAssociationDeleteData may include matters to be forwarded together. According to an embodi-ment, UpAssociationDeleteData may not be used and an HTTP Body may be empty.

The UPF may report that the association has been deleted in response to the request from the SMF, in operation 2203. UpAssociationDeletedData may include matters to be reported together.

According to an embodiment, when association deletion fails, the reason for the failure of association deletion may be added to ProblemDetails and transmitted by the UPF.

Figure 23:
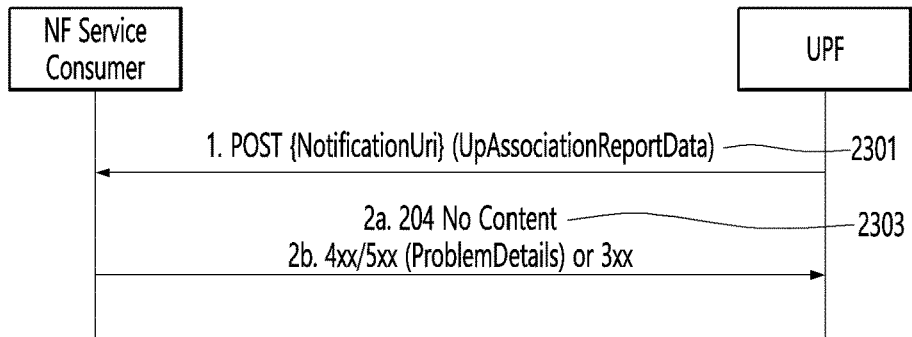
FIG. 23 is a signal flow diagram for an operation of reporting a association to an SMF according to an embodiment of the present disclosure.

FIG. 23 shows a signal flowchart of the operation of reporting on association to an SMF according to an embodiment of the present disclosure. The NF service consumer shown in FIG. 23 may include an SMF.

Referring to FIG. 23, when a reporting matter requested by the SMF occurs in UpAssociationCreateData in operation 2001 of FIG. 20 or UpAssociationUpdateData in operation 2101 of FIG. 21, an UPF may request POST in operation 2301 to NotificationUri received in operation 2001 of FIG. 20 or operation 2101 of FIG. 21. Matters requested to be reported by the SMF may include load information, overload information, QoS measurement for GTP-U path, clock synchronization error with other domains, etc.

The NF Service Consumer may respond without content to the received data, or when there is an error, the NF Service Consumer may transmit details of the error in operation 2303.

The POST method used in FIGS. 16, 17, 18, 19, 20, 21, 22, and 23 may be changed to a PUT or PATCH or DELETE method according to service needs.

In addition, UpSessionCreateData, UpSessionCreatedData, UpSessionUpdateData, UpSessionUpdatedData, UpSessionDeleteData, UpSessionDeletedData, UpSessionReportData, UpAssociationCreateData, UpAssociationCreatedData, UpAssociationUpdateData, UpAssociationUpdatedData, UpAssociationReleaseData, UpAssociationReleasedData, etc. used in FIGS. 16, 17, 18, 19, 20, 21, 22, and 23 are examples of names of data structures capable of containing data required for the service and may be referred to as other names.

A user plane function (UPF) in a wireless communication system may include a processor and a transceiver operably connected to the processor. In order to register a service of the UPF on a network repository function (NRF), the processor may transmit information on the UPF to the NRF. The information on the UPF may include a universally unique identifier (UUID), and high service information provided by the UPF. The processor may receive Information on the registered service of the UPF from the NRF.

According to an embodiment, the information on the UPF may include an instance ID of a UPF, a type of the UPF, a full qualified domain name (FQDN) of the UPF, an IPv4 address of the UPF, an IPv6 address of the UPF, a capacity of the UPF, a current load of the UPF, time of the current load of the UPF, detailed information of the UPF, and information on a service provided by the UPF.

According to an embodiment, the information on the UPF may further include setting information of the UPF. The setting information of the UPF may include SNSSAI and DNN information supported by the UPF, an SMF service area supported by the UPF, interfaces set in the UPF, a session type supported by the UPF, access traffic steering, switching, splitting (ATSSS) capability supported by the UPF, information on whether the UPF allocates an IP address, and information on a TAI supported by the UPF.

According to an embodiment, the processor may receive, from a session management function (SMF), a message saying that a session has been successfully created. The message saying that the session has been successfully created may include a generated packet data rule (PDR), generated tunnel endpoint identifier (TEID) or bridge information, and time sensitive communication management information.

According to an embodiment, the processor may receive, from a session management function (SMF) to the UPF, a message saying that session modification has been completed. The message saying that session modification has been completed may include packet data rule (PDR) information.

According to an embodiment, the processor may receive, from a session management function (SMF), a message saying that a session has been deleted.

According to an embodiment, when session deletion fails, the processor may transmit information on the reason for the failure of session deletion to a session management function (SMF).

According to an embodiment, when a association with a session management function (SMF) is created, the processor may further perform a process of transmitting operation information on the association to the SMF. The operation information may include generated Application Packet Flow Description, Recovery Timestamp, UP Function Features, and generated bridge information. When creation of a session with the SMF fails, the processor may transmit information on the reason for the failure to the SMF.

According to an embodiment, when a association to a session management function (SMF) is updated, the processor may transmit information related to association update to the SMF. When association update to the UPF fails, the processor may transmit information on the reason for the failure of association update.

According to an embodiment, the processor may transmit, to a session management function (SMF), a message saying that association has been deleted. When association deletion fails, the processor may transmit information on the reason for the failure to the SMF.

A session management function (SMF) in a wireless communication system may include a transceiver and a processor operably connected to the transceiver. The processor may transmit information on a user plane function (UPF) to a network repository function (NRF), and may receive a search result of the information on the UPF. The information on the UPF may include information on the UPF registered in the NRF.

According to an embodiment, information on the UPF may include a type of a network function (NF), single network slice selection assistance information (SNSSAI) supported by the NF, a data network name (DNN) supported by the NF, a tracking area identity (TAI) supported by the NF, and a session type supported by the NF.

According to an embodiment, the processor may transmit data for session creation to the UPF, and the data for session creation may further include a uniform resource identifier (URI) for a callback message for reporting that a session has been created.

According to an embodiment, the processor may transmit, to the UPF, a message for requesting the UPF to modify a session, and the message for requesting the UPF to modify the session may include data required for session modification.

According to an embodiment, the processor may transmit a message for requesting deletion of a previously created session to the UPF, and the message for requesting deletion of the previously created session may include information on data required for session deletion.

According to an embodiment, the processor may transmit a message about matters to be reported about a session to the UPF, and the message about the matters to be reported about the session may include information on a load state of the UPF and the degree of overload of the UPF.

According to an embodiment, when the message about the matters to be reported about the session has an error, the processor may further perform a process of transmitting details of the error to the UPF.

According to an embodiment, the processor may transmit a message for association creation to the UPF, and the message for association creation may include Recovery Timestamp, CP Function Features, Application Packet Flow Description, GTP-U Path QoS control information, and Clock Drift control information.

According to an embodiment, the processor may transmit a message for updating a present association to the UPF, and the message for updating the association may further include data required for association update.

According to an embodiment, the processor may transmit a message for requesting release of an established association to an UPF.

Methods according to the embodiments described in the claims of the present disclosure or in the specification may be implemented in the form of hardware, software, or a combination of hardware and software.

In the case of software implementation, a computer-readable storage medium in which at least one program (software module) is stored may be provided. The at least one program stored in the computer-readable storage medium is configured to be executable by at least one processor in an electronic device. The at least one program includes instructions for the electronic device to execute the methods according to the embodiments described in the claims of the present disclosure or the specification.

The program (software module or software) may be stored in non-volatile memory including random-access memory and flash memory, read-only memory (ROM), electrically erasable programmable read-only memory (EE-PROM), a magnetic disc storage device, a compact disc-ROM (CD-ROM), digital versatile discs (DVDs), optical storage devices of other types, or a magnetic cassette. Alternatively, the program may be stored in a memory composed of a combination of some or all of these memories. In addition, a plurality of such memories may be included. In addition, the program may be stored in an attachable storage device that is accessible through a communication network, such as the Internet, Intranet, a local area network (LAN), a wide area network (WAN), or a storage area network (SAN), or a combination thereof. The storage device may be connected through an external port to an apparatus performing an embodiment of the present disclosure. In addition, a separate storage device on the communication network may be connected to the apparatus performing an embodiment of the present disclosure.

In the above-described detailed embodiments of the disclosure, an elements included in the disclosure is expressed in the singular or the plural according to a presented detailed embodiment. However, the singular form or plural form is selected suitable for the presented situation for convenience of description, and the various embodiments of the disclosure are not limited to a single element or multiple elements thereof. Further, either multiple elements expressed in the description may be configured into a single element or a single element in the description may be configured into multiple elements.

Although the specific embodiments have been described in the detailed description of the present disclosure, various modifications and changes may be made thereto without departing from the scope of the present disclosure. Therefore, the scope of the present disclosure should not be defined as being limited to the embodiments, but should be defined by the appended claims and equivalents thereof.

What is claimed is:

1. A method performed by a session management function (SMF) in a wireless communication system, the method comprising:

transmitting, to a user plane function (UPF), a request message including a session reporting rule (SRR), wherein the SRR includes information on a callback uniform resource identifier (URI), and receiving, from the UPF, a report request message based on the information on the callback URI during a period included in the SRR or whenever an event occurs as requested in the SRR.

2. The method of claim 1, further comprising:

transmitting, to a network repository function (NRF), a query parameter using Nnrf_NFDiscovery services, wherein the query parameter includes at least one of a single network slice selection assistance information (SNSSAI), a data network name (DNN), or a tracking area identify (TAI).

3. The method of claim 2, further comprising:

receiving, from the NRF, an internet protocol (IP) address, or a full qualified domain name (FQDN) in response to the transmitting the query parameter.

4. The method of claim 1, further comprising:

receiving, from a first network function, information to be reported from the UPF, wherein the information to be reported from the UPF includes a second address to be reported, and transmitting, to the UPF, the information to be reported from the UPF and the second address to be reported included in the SRR, wherein the second address includes information on a version of an application programing interface (API).

5. The method of claim 1, wherein the callback URI includes information on a version of an application programing interface (API).

6. A method performed by a user plane function (UPF) in a wireless communication system, the method comprising:

receiving, from a session management function (SMF), a request message including a session reporting rule (SRR), wherein the SRR includes information on a callback uniform resource identifier (URI), and transmitting, to the SMF, a report request message based on the information on the callback URI during a period included in the SRR or whenever an event occurs as requested in the SRR.

7. The method of claim 6, further comprising:

transmitting, to a network repository function (NRF), information on the UPF, wherein the information on the UPF includes at least one of information on a single network slice selection assistance information (SNSSAI), information on a data network name (DNN), information on a service area of the SMF, or information on access traffic steering, switching, splitting (ATSSS) capability.

8. The method of claim 6, further comprising:

transmitting, to a first network function addressed as in the SRR from the SMF, a POST request message including information to be reported based on information received from the SMF.

9. The method of claim 8, wherein the first network function addressed as in the SRR from the SMF, further includes information on a version of an application programing interface (API).

10. A session management function (SMF) in a wireless communication system, the SMF comprising:

a transceiver; and a processor operably connected to the transceiver;

wherein the processor is configured to:

transmit, to a user plane function (UPF), a request message including a session reporting rule (SRR), wherein the SRR includes information on a callback uniform resource identifier (URI), and receive, from the UPF, a report request message based on the information on the callback URI during a period included in the SRR or whenever an event occurs as requested in the SRR.

11. The SMF of claim 10, wherein the processor is further configured to:

transmit, to a network repository function (NRF), a query parameter using Nnrf_NFDiscovery services, wherein the query parameter includes at least one of information on a single network slice selection assistance information (SNSSAI), information on a data network name (DNN), or information on a tracking area identify (TAI).

12. The SMF of claim 11, wherein the processor is further configured to:

receive, from the NRF, an internet protocol (IP) address, or a full qualified domain name (FQDN) in response to the transmitting the query parameter.

13. The SMF of claim 10, wherein the processor is further configured to:

receive, from a first network function, information to be reported from the UPF, wherein the information to be reported from the UPF includes a second address to be reported, and transmit, to the UPF, the information to be reported from the UPF and the second address to be reported included in the SRR, wherein the second address includes information on a version of an application programing interface (API).

14. The SMF of claim 10, wherein the callback URI includes information on a version of an application programing interface (API).

15. A user plane function (UPF) in wireless communication system, the UPF comprising:

a transceiver; and a processor operably connected to the transceiver;

wherein the processor is configured to:

receive, from a session management function (SMF), a request message including a session reporting rule (SRR), wherein the SRR includes information on a callback uniform resource identifier (URI), and transmit, to the SMF, a report request message based on the information on the callback URI during a period included in the SRR or whenever an event occurs as requested in the SRR.

16. The UPF of claim 15, wherein the processor is further configured to:

transmit, to a network repository function (NRF), information on the UPF, wherein the information on the UPF includes at least one of information on a single network slice selection assistance information (SNS-SAI), information on a data network name (DNN), information on a service area of the SMF, or information on access traffic steering, switching, splitting (ATSSS) capability.

17. The UPF of claim 15, further comprising:

transmitting, to the-a first network function addressed as in the SRR from the SMF, a POST request message including information to be reported based on information received from the SMF.

18. The UPF of claim 17, wherein the first network function addressed as in the SRR from the SMF, further includes information on a version of an application programing interface (API).

* * * * *